United States Patent [19]
Diong et al.

[11] Patent Number: 5,349,330
[45] Date of Patent: Sep. 20, 1994

[54] TOUCH PROGRAMMABLE ILLUMINATION MEANS

[76] Inventors: Chong K. Diong, 29, Jalan Chelagi, Damansara Heights, Kuala Lumpur, Malaysia, 50490; Kian T. Choong, 6 Cantonment Close, Pulau Pinang, Malaysia, 10350

[21] Appl. No.: 40,271

[22] Filed: Mar. 30, 1993

[30] Foreign Application Priority Data

Jan. 29, 1993 [MY] Malaysia .................. PI 9300148

[51] Int. Cl.$^5$ ............................................. G08B 13/19
[52] U.S. Cl. .................................. 340/567; 315/133; 315/155; 315/159; 340/691; 340/693; 362/20; 362/802
[58] Field of Search ............... 340/567, 691, 693; 315/133, 155, 159; 362/802, 20

[56] References Cited

U.S. PATENT DOCUMENTS

| | | |
|---|---|---|
| 4,694,281 | 9/1987 | McDermott et al. ............... 340/693 |
| 4,943,712 | 7/1990 | Wilder ............................. 250/221 |
| 5,015,994 | 5/1991 | Hoberman et al. ................ 340/567 |
| 5,146,209 | 9/1992 | Beghelli .......................... 340/693 |
| 5,293,097 | 3/1994 | Elwell ............................ 315/159 |

*Primary Examiner*—Glen Swann
*Attorney, Agent, or Firm*—Jacobson, Price, Holman & Stern

[57] ABSTRACT

Disclosed is a touch-programmable lighting and security device in the form of a stand lamp which can be programmed to provide illumination by means of an AC bulb or DC bulb in conjunction with parameters including the ambient light level, presence of people, and AC mains power failure. In one embodiment, this novel lighting and security device includes a transmitter which transmits an Alarm signal to a remote receiver upon detection of an intruder. This user friendly device conveniently plugs into any wall power outlet by means of a suitable length of cable and it can be easily programmed by touching different nonmetallic areas of the device. In one embodiment, four indicator lights in the form of LEDs are provided to identify its prevailing mode.

18 Claims, 3 Drawing Sheets

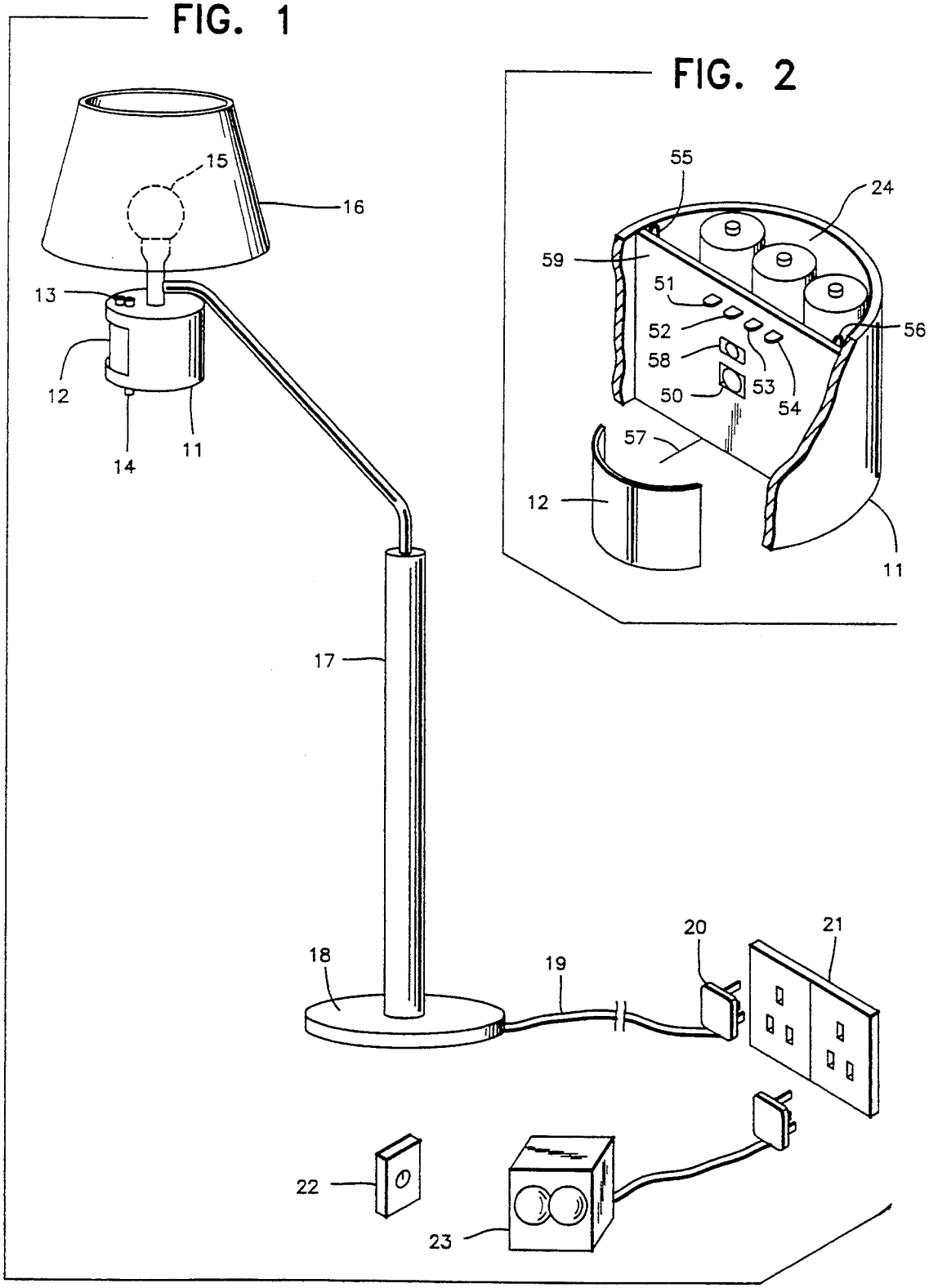

TOUCH PROGRAMMABLE ILLUMINATION MEANS

TECHNICAL FIELD

The present invention relates generally to lighting devices and more particularly to automatic lighting devices that provide illumination under user specified conditions.

BACKGROUND ART

Basic automatic and security lighting systems are well known in prior art. Generally, these devices turn on a light source automatically when the presence of one or more persons is detected within its range. The light source continues to illuminate for a predetermined period of time after the detection ceases. A light sensitive component is usually incorporated to inhibit the activation of the light source when the ambient light level is high. There are two broad categories, namely indoor and outdoor automatic lights. The latter have two inherent limitations. Firstly, they require installation. They have to be installed at a considerable height and wired permanently to the building's electrical system, usually by technical personnel. Secondly, they cannot be designed with many user programmable functions (modes) as it would be inconvenient to control them because of the height. For example, an outdoor motion detector as disclosed in U.S. Pat. No. 4,943,712 by Richard L. Wilder, has an override mode which could be activated by disrupting the power switch in a predetermined sequence within a short period of time. This can be confusing to non-technical users and impractical when there are more than 2 modes to control. Indoor automatic and security lights such as disclosed in U.S. Pat. No. 5,015,994 by Kenneth Hoberman and Kim Kirwan solve the installation problem as they can be plugged into a standard wall power outlet by a pronged plug built into the selfcontained lighting devices. However, their application is limited because existing wall outlets may not be situated in a favourable location for detection, illumination and/or ambient light sensing. This constraint may render it impossible to use such devices under certain circumstances. In addition, the self-contained construction of such indoor devices limits the type, size and wattage of the bulbs used.

While all preceding systems of the art have brought about a certain degree of convenience and protection in providing automatic lighting and security, them remains the need for a versatile, easily installed, user friendly and full feature device to provide programmable illumination and security at the same time.

SUMMARY OF INVENTION

The present invention overcomes the shortcomings of prior art by providing a courtesy lamp in the form of a stand lamp comprising a lamp stand, an AC bulb, a lamp shade, and an attachment which houses a passive infrared (PIR) motion detector, photocell, DC bulb, rechargeable batteries, encoder and transmitter, touch sensitive sensors, status indicators, and associated electronic circuits which can be programmed by touch to automatically provide illumination through:

(a) an AC bulb when it is dark (Sensor Light mode), OR (b) an AC bulb when it is dark AND in the presence of people (PIR mode) OR (c) an AC bulb irrespective of whether it is dark or whether the presence of people is detected (Manual Override mode), OR (d) a DC bulb under the conditions and modes in (a)-(c) when there is a disruption in AC mains power.

When in Alarm mode, it further sends a signal to a remote alarm sounder (which can be armed and disarmed by means on a portable remote controller) upon detection of the presence of an intruder. This user friendly device conveniently plugs into any wall power outlet via a suitable length of cable and it can be easily programmed by touching different non-metallic areas of the device. In the present embodiment, four indicator lights in the form of LEDs are provided to identify its prevailing mode/status.

Thus, one object of the present invention is to provide an automatic lighting device that requires no installation, is portable, and is not constrained to be located at existing wall power outlets. Another object of the present invention is to provide a full-feature automatic lighting and alarm system that has a wide variety of functions which can be easily programmed without the use of electromechanical means. A further object of the present invention is to provide an intelligent automatic lighting system that can provide illumination by way of AC power and DC power in conjunction with user definable parameters.

BRIEF DESCRIPTION OF THE DRAWINGS

FIG. 1 is an external view of one embodiment of a touch-programmable courtesy lamp constructed in accordance with the teachings of this invention;

FIG. 2 is a partially cut-out perspective view of an attachment which houses the electronics section of the lamp;

DETAILED DESCRIPTION OF THE PREFERRED EMBODIMENT

Figure 3:
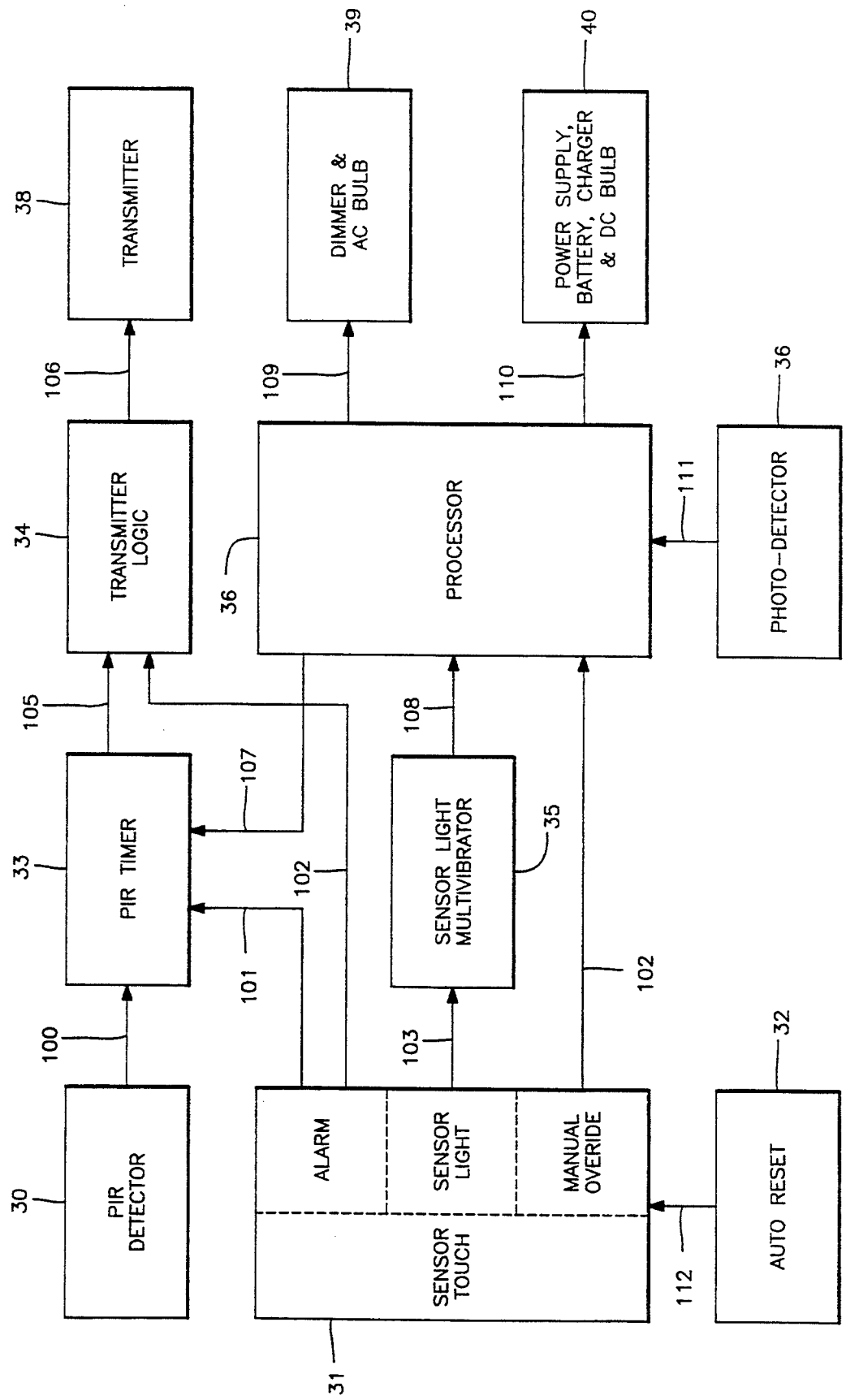
FIG. 3 is a block diagram of the electronics of the lamp.

Referring to FIG. 1, an attachment (11) equipped with a fresnel lens (12) and constructed from a non-conductive material which houses all the electronics is affixed to the high end of the lamp (10) next to an AC bulb (15) and a lamp shade (16). A stand (17), a base (18), an electric cord (19) and an electrical plug (20) make up therestor the lamp. The entire lamp is made operational by merely plugging it into a standard electrical wall outlet (21). A remote alarm receiver and sounder unit complete with rechargeable batteries and auto-dialer (23) which is also fully operational when plugged into any electrical wall power outlet receives an alarm signal transmitted from the lamp when it is in Alarm mode. The said signal will activate the alarm sounder and auto-dialer contained in the said remote receiver unit (23), which is armed and disarmed by a hand held remote controller (22).

FIG. 2 shows the detailed construction of key components housed in attachment (11). Status indicators for the Alarm mode (51), Sensor Light mode (52), PIR mode (53), and Manual Override mode (54) are mounted on the front side of the PCB (59). A DC halogen bulb (58) and pyroelectric sensor (50) are mounted below the LEDs and in the centre of curvature of fresnel lens (12), through which the said LEDs and said bulb is focused and made visible when illuminated. Touch sensor antennae for Sensor light/PIR mode (55), Manual Override mode (56), and Alarm mode (57) extend from the sides of PCB (59) and rest along the three sides of the housing of attachment (11), namely the left, right and bottom respectively. A set of backup batteries (24) is provided at the back of PCB (59).

When the lamp (10) is first powered up, an internal auto-reset circuit sets it to its default Sensor Light and Alarm mode. The Sensor Light LED (52), and Alarm LED (51) light up, and the AC bulb will illuminate whenever the ambient light intensity drops below a predetermined level irrespective of the presence or absence of people. An alarm signal is sent to the remote receiver (23) to sound an alarm whenever the presence of an intruder is detected. This mode is ideal when one goes on holiday as the lamp comes on automatically at night, switching off again as day breaks and the the alarm is triggered whenever an intruder enters the area of surveillance during day or night, even after a total power loss.

The default mode can be changed and all other possible mode combinations of the lamp (10) can be invoked by merely touching the respective sides of the attachment (11) housing. All modes toggle on and off every time their respective sides are touched. For example, touching the left side once changes the mode from Sensor Light mode to PIR mode. Touching it again changes it back to Sensor Light mode. Touching the fight side once enables the manual override mode, and touching it again causes the lamp to revert back to automatic mode (depending on the PIR or Sensor Light mode setting). Touching the bottom enables the Alarm mode, and touching it again disables it. The four status LEDs (51,52,53,64) respond accordingly every time the mode is changed.

When set to PIR mode, the PIR LED (53) flashes momentarily whenever motion is detected. The AC bulb (15) now illuminates for a predetermined period of time which is user adjustable by means of timer knob (14) only when it is dark and during continued detection of the presence of people. When set to the Manual Override mode, the Manual Override LED (54) lights up and AC bulb (15) is illuminated permanently. The Manual Override can be activated in either the Sensor Light or PIR mode with the same effect. The AC bulb is provided with a dimmer which can be adjusted by means of a dimmer knob (13) to vary its brightness. When there is a disruption of power in the AC mains, a set of rechargeable batteries is provided as backup power to all logic circuits and to provide emergency lighting by way of a DC bulb (58) located at the focal point of the fresnel lens. In the manual override mode, the emergency light is activated whenever there is an AC mains power failure. In the Sensor Light mode, the DC bulb (61) is activated when there is a power failure AND when it is dark. In the PIR mode, the emergency light is activated in the event of a power failure only when it is dark AND when the presence of people is detected. These features make the lamp (10) a very flexible and intelligent lighting device as there is no unnecessary wastage of backup power, thereby requiting only a low ampere-hour rating battery and enabling the entire attachment unit to be made small and light. Table 1 below summarizes all possible combination of modes and output functions.

TABLE 1

| S/L | PIR | MAN | ALM | AC Mains ON | AC Mains Fail |
|---|---|---|---|---|---|
| X | | | | AC[d] | DC[d] |
| X | | X | | AC | DC |
| X | | | X | AC[d], Tx[m] | DC[d], Tx[m] |
| X | | X | X | AC, Tx[m] | DC, Tx[m] |
| | X | | | AC[d,m] | DC[d,m] |
| | X | X | | AC | DC |
| | X | | X | AC[d,m], Tx[m] | DC[d,m], Tx[m] |
| | X | X | X | AC, Tx[m] | DC, Tx[m] |

AC = AC bulb on, DC = DC bulb on, Tx = Wireless transmission on [c,c] = Conditions where [d] = Dark, and [m] = Motion detected The above functions can be better understood by referring to a block diagram of one preferred embodiment as shown in FIG. 3. The PIR Detector block (30) detects the presence of a moving infrared energy source and outputs an active-low pulse on lead (100), which is coupled to PIR Timer block (33). The latter illuminates the PIR LED momentarily each time motion is detected and restarts the PIR timer circuit. The first output of the timer circuit is coupled via lead (107) to Processor block (36), which processes the said timer block output together with other inputs to produce two outputs on leads (109) and (110). These two outputs enables the AC bulb block (39) and DC bulb block (40) respectively. The second output of PIR timer block (33) drives the Wireless Transmitter block (38) via Transmitter Logic block (34) when the Alarm mode is active.

The Sensor Touch block (31) comprises a set of three identical touch sensors, status memory and mode indicator sections, one each for the Alarm, Sensor Light, and Manual Override modes. When set to Alarm mode, it enables the PIR Timer block (33) and Transmitter block(34) vialeads(101) and (102) respectively. When set to Sensor Light mode, PIRTimer block (33) is disabled via lead (101) provided the Alarm mode is not active. At the same time, the Sensor Light Multivibrator block (35) is enabled via lead (103) and its output coupled to Processor block (36) via lead (108). When set to Manual Override mode, the Processor block (36) receives an active high signal from Sensor Touch block (31) via lead (104). Auto-reset block (32) provides an automatic reset upon power-up to the system via lead (112). PhotoDetector block (36) provides ambient light sensing information to the system via lead (111). The inputs into the Processor block (36) on leads (104), (107), (108) and (111) are processed such that the lamp functions according to table 1 above.

Figure 4:
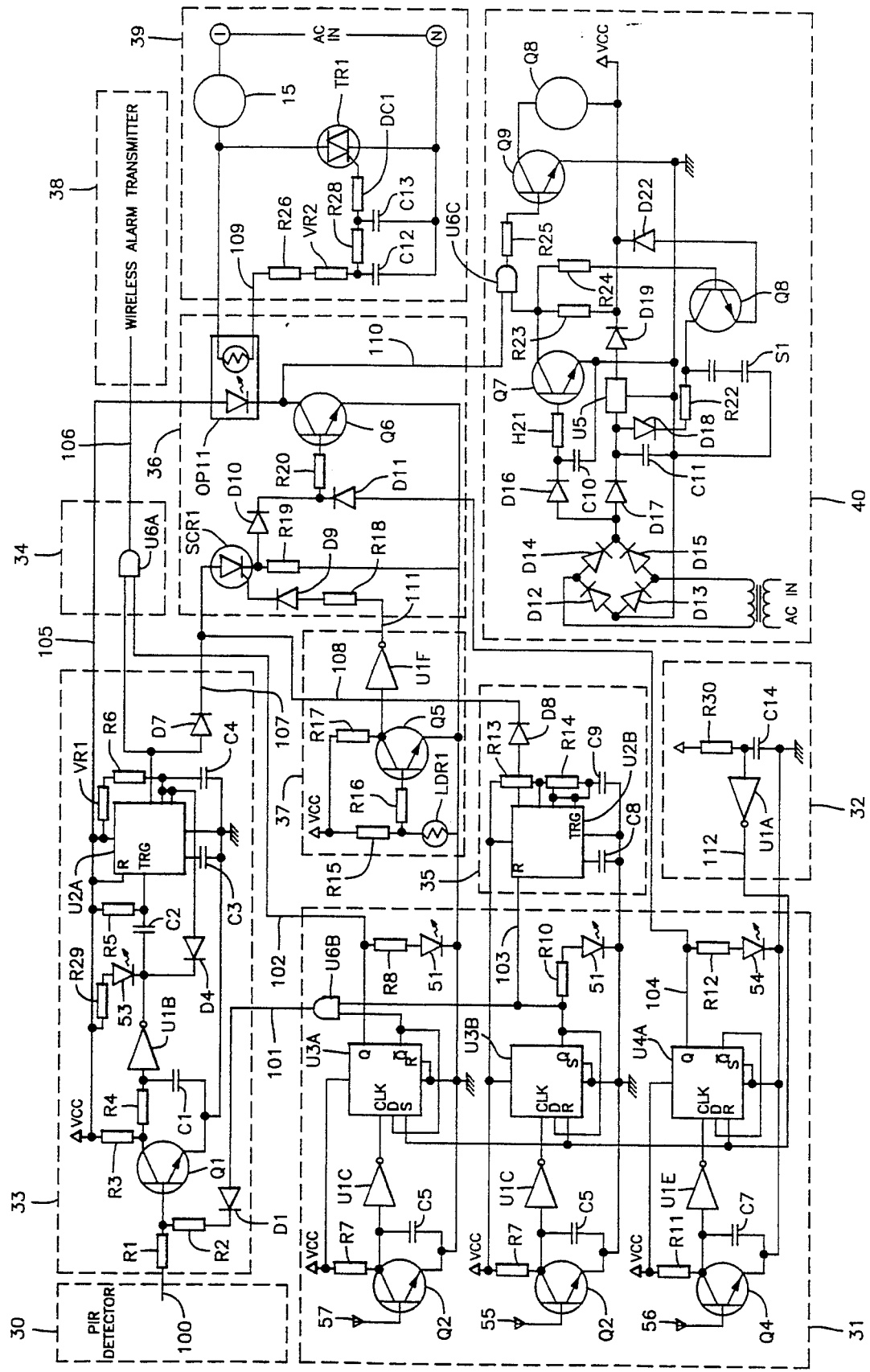
FIG. 4 is a schematic diagram of one preferred embodiment of the block diagram in FIG. 3.

FIG. 4 shows the detailed circuit of a preferred implementation of the block diagram described above. Referring to block 33, an active low signal from the PIR detector block is coupled to transistor (Q1) via resistor (R1). When motion a detected, a low pulse at the base will turn off transistor (Q1) momentarily. Capacitor (C1) charges up through resistors (R3) and (R4). This R-C network forms a pulse count circuit whose function is to eliminate false triggering due to spurious perturbation arising from electrical or environmental interference. The resulting pulse is shaped and inverted by Schmitt inverter (U1B), whose active low output drives PIR LED (53) via resistor (R29). The negative transition at the output of Schmitt inverter (U1B) is coupled via capacitor (C2) and resistor (R5) to start timer 1C (U2A), which is one half of a 556 Dual Timer. Resistor (R6), variable resistor (VR1) and capacitor(C4) determine the (ON duration of the timer while diode (D4) provides a discharge path for capacitor (C4), enabling the timer to restart the timing cycle every time a new movement is detected. A PIR disable signal is received on lead (101) from block (31). When this signal is high, transistor (Q1) is positively biased through diode (D1) and resistor (R2), and it will not respond to any incoming signal from the PIR detector block. This condition prevails when the Sensor Light mode is active and the Alarm mode is inactive.

The output of timer 1C (U2A) is coupled to the first input of AND gate (U6A) in block 4. When the second input of said AND gate which is connected to lead (102) is also high, as when the Alarm mode is active, a high signal is coupled to Alarm Transmitter block (38) via lead (106) to activate the remote alarm receiver unit (23). The output of timer 1C (U2A) is also coupled to Processor block (36) via blocking diode (D7) on lead (107). When the signal on lead (107) is high, Silicon Controlled Rectifier (SCR1) conducts through resistor (R 19) if the ambient light level is low. The lightlevel information is processed in block (37) where a light dependent resistor (LDR1) is used to bias the gate of transistor (Q5) through resistors (R15) and (R16). When it is dark, the resistance of (LDR1) drops to a level where transistor (Q5) is sufficiently biased to conduct through collector resistor (R17). The collector voltage of transistor (Q5) is shaped and inverted by Schmitt inverter (U1F) and coupled to the gate of Silicon Controlled Rectifier (SCR1) via lead (111), resistor (R18) and diode (D9). This caused the SCR to latch. The resulting high level at the cathode of (SCR1) is coupled via diode (D10) and resistor (R20) to transistor (Q6), causing it to conduct through opto-coupler (OPT1).

When the opto-coupler conducts, it provides an AC current path for the control section of the dimmer block (39), comprising limiting resistor (R26), variable resistor for dimmer control (VR2), capacitors (C 12), (C 13), resistor (R25) and disc (DC1). As the dimmer control resistor (VR2) is altered, the phase angle of conduction to the gate of triac (TR1) is altered accordingly, thereby providing illumination of varying intensity through the AC bulb (15) whenever a movement is detected. The bulb will continue to illuminate as long as the timer 1C (U2A) output is high. The increase in ambient light level resulting from the illumination of the AC bulb (15) will not turn it off because Silicon Controlled Rectifier (SCR1) is already latched, ignoring any changes at its gate input. The latter will unlatch only when the timing cycle determined by timer 1C (U2A) has elapsed.

Sensor Touch block (31) provides the necessary circuits to change, register and display the various modes of operation of the lamp. It consists of three identical touch sensors and memory circuits, one each for the Alarm, Sensor Light and Manual Override mode. The PIR mode does not require a separate circuit because it is mutually exclusive of the Sensor Light mode.

Referring to the Alarm mode circuit at the top of block (31), a suitable length of single strand wire is coupled to the base of a high gain NPN transistor (Q2) to act as an antenna (57). Collector resistor (R7) which is tied to the positive supply is typically 1 megaohm or higher, depending on the desired sensitivity. When an object such as one's palm is brought near the antenna (57), an AC hum is induced on said antenna. This signal is amplified by the transistor (Q2). Capacitor (C5) which is typically 0.1 microfarad is coupled between the collector of transistor (Q2) and ground to act as a smothering capacitor for the amplified AC hum. When no object is brought near the antenna, the transistor (Q2) is off, the collector voltage is high and the Schmitt inverter (U1C) output is low. When an object is brought near the antenna, the collector voltage goes low and the Schmitt inverter (U1C) output goes high, producing a clock pulse for the flip-flop 1C (U3A) circuit coupled to it. A CMOS 4013 dual D-flip-flop is configured such that it changes state at every incoming clock pulse. The Q output of 1C(U3A) is coupled to Alarm LED(51) via resistor (R8). When set to the Alarm mode, Alarm LED (51) lights up and a high signal is sent via lead (102) to the Transmitter Logic block (34) discussed previously The circuit for Sensor Light mode comprises a similar set of components (55), (Q3), (R9), (C6), (U1D) and (U3B). When set to Sensor light mode, Qbar of 1C (U3B) is high and this causes the Sensor Light indicator LED(52) to light up via resistor(R10). Qbar of 1C(U3B) is also "ANDed" with Qbar of 1C (U3A) by AND gate (U6B) to provide the PIR disable signal on lead (101) discussed previously. In addition, the Qbar output of 1C (U3B) is coupled to the Reset input of timer 1C (U2B) configured as a free running multivibrator. When the Sensor Light mode is active, 1C (U2B) is enabled and produces an output which is high for about 10 minutes and low for a fraction of a second. This duty cycle is determined by timing resistors (R13), (R14) and capacitor (C9). The output of 1C (U2B) is coupled via blocking diode (D8) on lead (108) to processor block (36). When on Sensor Light mode, this arrangement allows the circuit to update the ambient light level information once every 10 minutes by turning the AC bulb off momentarily and taking a reading of the surrounding light intensity. If it is below a predetermined level, it will turn on the bulb (15) again. Otherwise, it will reset the Silicon Controlled Rectifier (SCR1) and turn off the bulb (15) until the ambient light intensity falls below a predetermined level again. Since the OFF time is very short, it will not be noticeable to the eye.

The circuit for Manual Override mode comprises a set of similar components (56), (Q4), (R11), (C7), (U1E) and (U4A). When set to Manual Override mode, Q output of 1C (U4A) is high and it lights up Manual Override indicator (54) via resistor (R12). The said output is also coupled to Processor block (36) via diode (D 11) on lead (104). A high output will provide a permanent positive bias for transistor (Q6), thereby tuning on the AC bulb (15) permanently irrespective of other prevailing conditions and operation modes.

Auto-reset block (32) provides a short positive pulse upon power-up to Set 1C (U3A) and Reset ICs (U3B) and (U4A). This will put the lamp in its default mode after a total power loss. Said positive pulse is produced during the brief period alter power-up when capacitor (C14), which is charged via resistor (R30), has not reached the threshold voltage required to turn the output of Schmitt inverter (U1A) low.

Block (40) provides regulated DC power supply through step down transformer (T1), bridge rectifier diodes (D12–15), blocking diode (D17), smothering capacitor (C11) and 6.0 Volt regulator (U5). Diode (D18) charges backup battery (S1) through current limiting resistor (R22). When AC power is present, capacitor (C10), which is very much smaller in value than capacitor (C11), charges up through diode (D16) and provide a positive bias via resistor (R21) to turn on transistor (Q7). When there is an AC power failure, transistor (Q7) turns off providing a positive bias through resistor (R23) and (R24) to turn on transistor (Q8), which diverts the battery power to the VCC line through diode (D22). The collector voltage of transistor (Q7) is "ANDed" with collector voltage of transistor (Q6) by AND gate (U6C) to provide a positive base bias to transistor (Q9) through resistor (R25). Hence, when there is an AC power failure, and the logic of the rest of the circuit calls for the AC bulb (15) to be illuminated, transistor (Q9) turns on to illuminate the DC bulb (58) by way of backup battery power instead.

While the above is a complete description of a preferred embodiment of the present invention, it is understood that the invention is not limited thereto, as it is intended that the invention be as broad in scope as the art will allow. Thus, one variation to the preferred embodiment is to provide the Alarm indicator LED (51) with a flasher circuit such that when set to Alarm mode, said LED will flash continuously. Alternatively, a self-contained flashing LED may be used. The lamp may also be so constructed such that the lamp stand is modular and the lamp shade is collapsible or totally absent. The entire lamp may take the form of a table lamp or any such form that provides the same functions. Further, backup batteries may be located at the base or any other part of the lamp body. In this case, there is virtually no limitation to the size of the batteries. This can turn the lamp into a truly portable lamp that could provide illumination without AC source for up to a month between chargings. Communication between the lamp, remote controller and the remote sounder may be implemented by means other than RF. The remote alarm sounder unit could also be built into the base of the lamp or be an integral part of attachment (11). Therefore, it will be appreciated by those skilled in the art that yet other modifications could be made to the provided invention without deviating from its spirit and scope as so claimed.

What we claimed is:

1. A touch programmable illumination means having a plurality of operation modes and comprising:
   (a) means for receiving manual inputs by way of touch;
   (b) means for receiving automatic inputs by detecting the presence of moving infrared radiation sources, ambient light level, and the presence of an alternating current power source;
   (c) output means including a first light source which can provide illumination when supplied with a source of alternating current electrical power and a second light source which can provide illumination in the absence of alternating current electrical power;
   (d) transmitter means for transmitting an electromagnetic signal when a moving infrared radiation source is detected;
   (e) means for conditioning said output means in response to signals received from said manual input means and said automatic input means;
   (f) a remote receiver for receiving and decoding said electromagnetic signal;
   (g) means to ann and disarm said remote receiver;
   (h) a battery backup power source for operating the said second light source in the absence of alternating current electrical power; and
   (i) means to provide an electrical connection to a source of alternating current electrical power.

2. The illumination means as claimed in claim 1 wherein said battery backup power source comprises a rechargable battery.

3. The illumination means as claimed in claim 1 wherein the means for receiving manual inputs comprises a plurality of circuits each including an antenna for detecting an electrical signal induced onto it by any part of the human body, an amplifier means for amplifying said signal, and a pulse conditioner means for producing an electrical pulse from the said amplifier means.

4. The illumination means as claimed in claim 3 wherein said means for receiving manual inputs further comprises a plurality of circuits each capable of altering and registering the specific operation mode under which the illumination means is to function.

5. The illumination means as claimed in claim 4 wherein the specific operation mode is indicated by an indicator means.

6. The illumination means as claimed in claim 1 wherein said operation modes comprises:
   (a) a first operation mode wherein said first light source is energized upon the detection of a moving infrared radiation source and remains energized for a predetermined period of time after the cessation of said detection provided the ambient light intensity is below a predetermined level.
   (b) a second operation mode wherein said first light source is energized when the ambient light intensity is below a predetermined level even without a positive detection of a moving infrared radiation source;
   (c) a third operation mode wherein said first light source is energized regardless of the detection of a moving infrared radiation source or ambient light level;
   (d) a fourth operation mode wherein said electromagnetic signal is transmitted to said remote receiver means.

7. The illumination means as claimed in claim 6 including:
   (a) a first indicator means which is energized at each detection of a moving infrared energy source when functioning under said first operation mode;
   (b) a second indicator means which is energized permanently when functioning under said second operation mode;
   (c) a third indicator means which is energized permanently when functioning under said third operation mode;
   (d) a fourth indicator means which is energized permanently when functioning under said fourth operation mode.

8. The illumination means as claimed in claim 7, wherein each indicator means is adapted to give a visual indication of the operation mode.

9. The illumination means as claimed in claim 8, wherein each indicator means is a light emitting diode.

10. The illumination means as claimed in claim 8 wherein the fourth indicator means flashes continuously when functioning under said fourth operation mode.

11. The illumination means as claimed in claim 6, further comprising:
   (a) means to prevent said first light source from being de-energized due to the feed-back of their own illumination while functioning under said first and second operation mode;
   (b) means to de-energize said first light source after the ambient light level rises above a predetermined level while functioning under said second operation mode.

12. The illumination means as claimed in claim 6, further compromising means for adjusting the duration for which said first light source remains energized after cessation of a moving infrared radiation source while functioning under said first operation mode.

13. The illumination means as claimed in claim 6, further comprising means to automatically reset to a preferred operation mode after a total loss of electrical energy.

14. The illumination means as claimed in claim 1, wherein upon cessation of the alternating current electrical power source the said second light source will be energized in place of said first light source.

15. The illumination means according to claim I wherein said remote receiver includes an audible sound producing device.

16. The illumination means as in claim 15 wherein said remote receiver further includes an auto-dialler.

17. The illumination means as claimed in claim 1 further comprising means for adjusting the intensity of said first light source.

18. The illumination means as claimed in claim 1, including means for housing all electronic, electrical and mechanical components in a self contained, portable unit.

* * * * *